(12) United States Patent
Laflen et al.

(10) Patent No.: US 9,255,779 B2
(45) Date of Patent: Feb. 9, 2016

(54) WIRELESS TAPER GAUGE AND METHOD OF USING SAME

(71) Applicant: GENERAL ELECTRIC COMPANY, Schenectady, NY (US)

(72) Inventors: John Brandon Laflen, Niskayuna, NY (US); John William Herbold, Greenville, SC (US); William Judson Hendrix, Laurens, SC (US); Jason Harris Karp, Niskayuna, NY (US); Yakov Polishchuk, Niskayuna, NY (US); Robert William Tait, Niskayuna, NY (US); Steven William Wik, Schenectady, NY (US); Juntao Wu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 158 days.

(21) Appl. No.: 14/133,967

(22) Filed: Dec. 19, 2013

(65) Prior Publication Data

US 2015/0096183 A1    Apr. 9, 2015

Related U.S. Application Data

(60) Provisional application No. 61/889,025, filed on Oct. 9, 2013.

(51) Int. Cl.
*G01B 3/46* (2006.01)
*G01B 3/26* (2006.01)
*G01B 3/30* (2006.01)
*G01B 5/14* (2006.01)

(52) U.S. Cl.
CPC ........ *G01B 3/26* (2013.01); *G01B 3/306* (2013.01); *G01B 3/46* (2013.01); *G01B 5/14* (2013.01)

(58) Field of Classification Search
CPC ............ G01B 3/46; G01B 3/306; G01B 3/26; G01B 5/14
USPC ........................ 33/542, 542.1, 544.4, 555.3
See application file for complete search history.

(56) References Cited

U.S. PATENT DOCUMENTS

| 2,330,412 | A | * | 9/1943 | Dierking | 33/567.1 |
|---|---|---|---|---|---|
| 3,422,541 | A | * | 1/1969 | Victor | 33/534 |
| 4,473,952 | A | * | 10/1984 | Mariani | 33/836 |
| 5,363,562 | A | | 11/1994 | Schmidt | |
| 5,517,764 | A | | 5/1996 | Lobb, Jr. | |
| 5,551,162 | A | * | 9/1996 | Struble | 33/548 |

(Continued)

FOREIGN PATENT DOCUMENTS

| EP | 0967456 A2 | 12/1999 |
|---|---|---|
| JP | 8122048 | 5/1996 |

OTHER PUBLICATIONS

"TG/2 Electronic Taper Gauge for Accurate Mold Tapers", SMS Millcraft, 2010.

*Primary Examiner* — G. Bradley Bennett
(74) *Attorney, Agent, or Firm* — John P. Darling

(57) ABSTRACT

A taper gauge that includes an elongate taper assembly that has a tip section and an electronics section that includes a location determining element that collects data related to a measurement area when the tip section is inserted in the measurement area and a power source. An embodiment allows for increased precision, accuracy, and speed for wireless measurement of gaps. A method and system that uses the taper gauge.

17 Claims, 6 Drawing Sheets

(56) References Cited

U.S. PATENT DOCUMENTS

| | | |
|---|---|---|
| 5,768,794 A | 6/1998 | Kelly |
| 6,732,443 B1 | 5/2004 | Margulius et al. |
| 7,275,422 B2 | 10/2007 | Holi et al. |
| 8,263,129 B2 | 9/2012 | DeSimone et al. |
| 8,572,860 B2 * | 11/2013 | Fritzinger ............... 33/512 |
| 2004/0083618 A1 * | 5/2004 | Kelly ..................... 33/544.4 |
| 2013/0063277 A1 | 3/2013 | Christiansen |
| 2013/0168364 A1 * | 7/2013 | Ketelaar et al. .......... 219/69.17 |

* cited by examiner

WIRELESS TAPER GAUGE AND METHOD OF USING SAME

CROSS REFERENCE TO RELATED APPLICATIONS

This application is a non-provisional patent application that claims priority to the benefit of the Oct. 9, 2013 filing date of U.S. provisional application No. 61/889,025 (Entitled: WIRELESS TAPER GAUGE AND METHOD OF USING SAME), which is incorporated herein by reference in its entirety.

BACKGROUND

The present application relates generally to gauges for clearance measurements, and more particularly to taper gauges for automatically measuring and/or recording gaps or clearances, methods of using the taper gauges, and systems that include the taper gauges.

Taper gauges are heavily used in the industrial environment to measure precise gaps, clearance, spacing, positioning and like, such as in gas turbine, jet engine, etc., which is important for regular maintenance, equipment safety, process optimization, and vibration mitigation. The taper gauge itself is typically a hand-held measurement tool that includes a tapered tip section that has in increasing thickness. The gauge has markings and the operator manually inserts the gauge into a space or measurement area until the insertion stops and/or the taper gauge has reached a snug fit in the measurement area, such that the taper gauge fills the thickness of the gap. The operator can then visually look for a marking on the side of the taper gauge that either corresponds to the thickness of the gap or that is the closest marking to the thickness of the gap. Experienced technicians have developed skills and know-how gained through experience and training to accurately use a taper gauge. These measurements are then typically recorded on paper or typed into a database. Thus, human-induced error(s) is therefore inevitable during this process, which may result in unsafe and inefficient operation with more costly maintenance.

Accordingly, it would be desirable to reduce or substantially eliminate the manual steps involved in determining and recording a gap or clearance measurement using a taper gauge. Such a measuring system should be highly accurate, efficient and/or allow for more objective determinations.

BRIEF DESCRIPTION

In accordance with one aspect of the present disclosure, a taper gauge, or gauge, for measuring the width or thickness of a gap is disclosed.

The gauge includes a housing, a plurality of measuring leaves and a measurement determination mechanism. The plurality of measuring leaves are rotatably coupled to the housing along a common axis of rotation and selectively movable between a home position and an extended position. Each measuring leaf defines an elongate, substantially flat shape defining a thickness, and one or more extended leaves can be inserted into the gap such that the combined thickness of the one or more extended leaves substantially corresponds to the thickness of the gap. The measurement determination mechanism is configured to determine the thickness of the gap by at least one of detecting which of the leaves are in the extended position and/or home position, measuring the total thickness of the leaves in the extended position, and measuring the total thickness of the leaves in the home position. The gauge is also configured to at least one of display the thickness of the gap on a display, transmit a signal representing the thickness of the gap to a computing device. The computing device can be a local device or remote device. For example, the user can employ a local device that receives and processes the signals from the gauge. The signals in one example are communicated to a remote device such as a maintenance department for processing.

In an embodiment, a taper gauge comprises: an elongate taper assembly having a tip section; an electronics section comprising: a location determining element configured to collect data related to a measurement area when the tip section is inserted in the measurement area; and a power source.

In another embodiment, a method comprises: inserting an elongate taper assembly of a taper gauge into a measurement area, wherein the taper gauge further comprises: a slidable measurement assembly; and an electronics section comprising: a location determining element configured to collect data related to a measurement area; and a power source; sliding the slidable measurement assembly until a portion of slidable measurement assembly contacts a surface of the measurement area; and initiating the location determining element so as to collect data related to a dimension of the measurement area.

In another embodiment, a measurement system comprises: a taper gauge comprising: an elongate taper assembly having a tip section at a first end distal from a second end; and a measurement assembly engaging the taper assembly, wherein the measurement assembly comprises an electronics section, said electronics section comprising a location determining element configured to collect data related to a measurement area when the tip section is inserted in the measurement area and a power source; and a computing device in communication with the taper gauge.

In another embodiment, taper gauge for measuring a gap of a measurement area, the gauge comprises: an elongate taper assembly having a tip section and an opposing handle section, wherein the taper assembly comprises a magnetic encoded section on at least one side of the taper assembly; and a measurement assembly slidably engaging the taper assembly, wherein the measurement assembly comprises an electronics section, said electronics section comprising a decoder and a power source.

In another embodiment, taper gauge comprises: an elongate taper assembly having a tip section at a first end distal from a second end, wherein the taper assembly comprises a magnetic encoded section; and a measurement assembly engaging the taper assembly, wherein the measurement assembly comprises an electronics section, said electronics section comprising a decoder, a power source, and a transmission section.

In some embodiments, the gauge may be configured to at least automatically display the thickness of the gap on the display or transmit the signal representing the thickness of the gap to the computing device once the taper gauge is properly inserted into the gap.

In accordance with another aspect of the present disclosure, a method of using a taper gauge to measure the thickness of a gap is disclosed.

DRAWINGS

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The present disclosure describes multiple methods for digitization and automation of thickness measurements. Whereas traditional taper gauge measurements are taken visually using an analog scale the present system and process allows for extremely accurate measurements to be taken, and according to one example, with only a single button press. A further feature includes the ability to wirelessly transmit digital measurements taken on the device to a data collection computer such as a tablet, laptop, or desktop.

Figure 1:
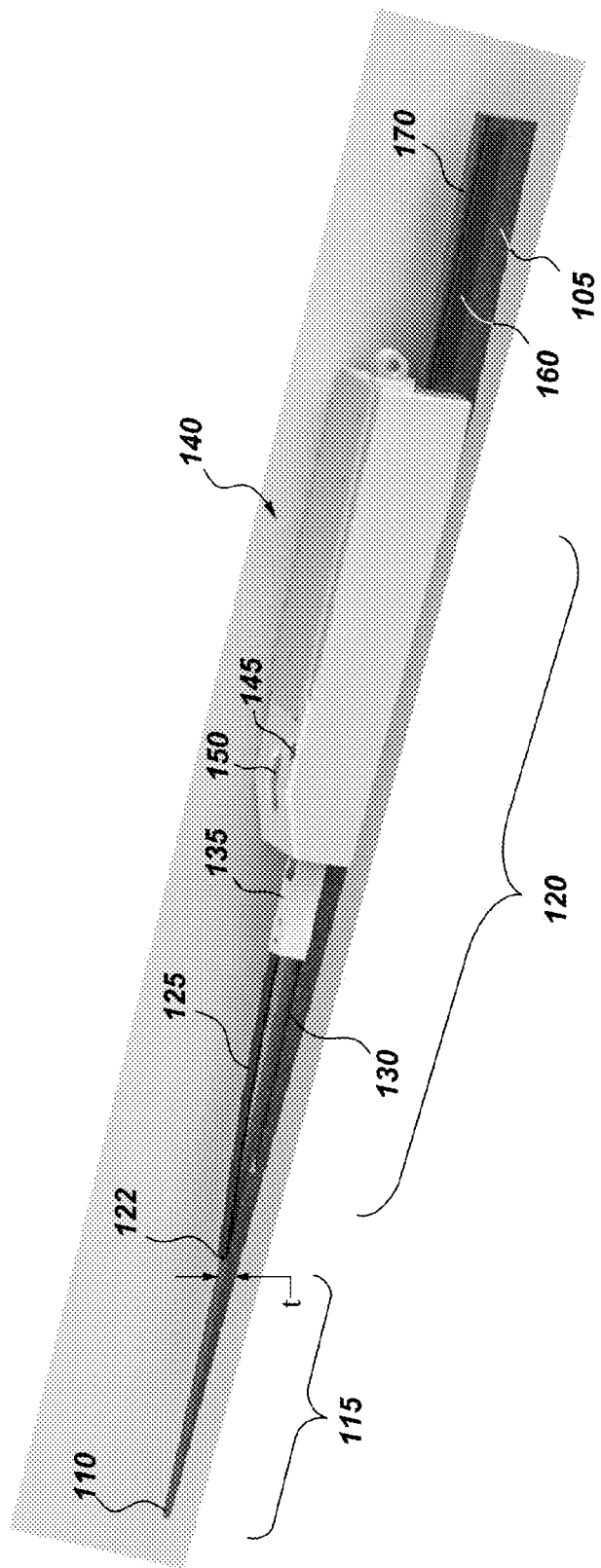
FIG. 1 is a top view of a first exemplary taper gauge for measuring a gap.

FIG. 1 illustrate an exemplary taper gauge 100 that includes a taper assembly 105 extending from a tip section 110 to a handle section 170. Extending from the tip section 110 is a tapered section 115 having an increasing thickness 't' as the taper assembly extends from the tip section 110. The tapered section 115 in one example is relatively planar on at least two sides defining the measuring surfaces and having an increasing thickness t. In another example the tapered section is cylindrical. There is a handle section 170 on the opposing end from the tip section 110, wherein the handle can be, for example, metal, plastic and the like that is used to hold the taper gauge 100.

Coupled to the taper assembly 105 is a magnetic encoded section 160 that contains magnetic properties that allow a decoder chip (not shown) to determine a position along the magnetic encoded section 160. In one example the magnetic encoded section 160 is coupled on both sides of the taper assembly 105 such that a decoder can be placed on one or both sides of the taper assembly 105.

There is a slidable measurement assembly 120 which includes an electronic section 140 and a guide section 135 that is configured to slide along the grooves 130 that are typically on both sides of the taper assembly 105. The guide section 135 in one example has an opening that allows an operator to take a manual measurement from the markings on the marking section 125. The marking section 125 has a plurality of markings at regular intervals such as 1 millimeter, 2 millimeter, 5 millimeter and the like. The markings allow for an operator to manually measure the marking which corresponds to the thickness of the gap that is measured by the taper gauge. The markings are also useful for calibration of the gauge, to confirm measurements, redundancy, and when wireless operations are not functioning or impractical.

The electronics section 140 in this example include a push button 145 that is used to engage the electronics such as when the taper gauge 100 is properly inserted in the measurement area. In one example there is also a display 150, such as an LCD display to allow an operator to view the gap measurement or the data reading from the gauge.

In operation, the gauge 100 is inserted into the measurement area until properly and firmly positioned in the gap. The slidable measurement assembly 120 is pushed or slid so that the curled end 122 of the slidable assembly 120 contacts the measurement area. The button 145 can be pressed to provide the measurement of the thickness of the gap based on the decoder reading wherein the measurement may be displayed on display 150.

As discussed further below, the electronics section 140 may include other mechanisms for facilitating thickness measurement, recording, displaying, transmitting and the like of gap or clearance measurements. The taper gauge 100 is inserted between adjacent components (e.g., in a clearance) in the thickness t. If the tapered section 115 fits relatively snugly in the clearance, the thickness t corresponds to the thickness or size of the clearance which can be determined using the slidable measurement assembly 120 by the marking section 125 and/or the decoder of the electronics assembly 140 based on the reading from the magnetic encoded section 160.

It is noted that as non-digital taper gauges have been used in industry for quite some time, and have become widely used, many relevant users are already trained and skilled in utilizing the taper gauge to manually determine a gap or clearance. The present device provides both the same feel of the manual device but also allows for automation and wireless reporting of the data to provide more objective data in a more efficient manner.

In one example, the measurement determination may be capacitor-based, optical-based, resistor-based, magnetic-based, inductance-based, notch pattern-based or any other effective or operable methodology or combinations thereof.

In one example, the particular electrical signal from the electronics section 140 may utilize a lookup table or calculation to convert or associate the electrical signal or the like to a predetermined, calibrated thickness measurement. As described further herein, the taper gauge 100 may be further configured to contrast the thickness measurement determined by the measurement determination mechanism.

The electronics section 140 may thereby include other components necessary for digitally measuring clearances. For example, the electronics section 140 may include one or more microprocessor, printed circuit board, memory component (including instructions, data, algorithms and the like saved therein), processor, power source or supply (e.g., a battery, a serial interface (e.g., USB, RS232, and/or AC/DC transformer) or power generator), visual indicator components (e.g., display, LEDs, etc.), audible indication components, controller, sensor, transmitter, antenna, transceiver, system bus architecture and/or direct memory access component, other circuitry components and the like.

In one example the system may include a calibration button or other that can be engaged by the user to "instruct" the taper gauge 100 that a particular thickness measurement taken has a reference thickness. The taper gauge 100 may be recalibrated by reestablishing the benchmark or reference thickness measurement.

The display 150 of the gauge may include other engageable and/or visual and tactile indicators other than those in connection with the measurement determination mechanism. For example, the electronics section may include an LCD screen or other display mechanism 150.

In some embodiments, the taper gauge 100 is configured to transmit a determined clearance measurement or conduct automatic registration, such as wirelessly or through a wired connection. Therefore, the taper gauge 100 may include any mechanism or configuration for facilitating or achieving such a transmitting or registration feature. For example, the taper gauge 100 may include an antenna mechanism, such as a radio frequency antenna, for wirelessly transmitting or registering clearance measurement data to a computing device and/or a hard-wired port configured for transmitting or registering clearance measurement data though a wired connection to a computing device. The taper gauge 100 may be configured such that the user is able to instruct the taper gauge 100 to transmit or register a recently acquired clearance measurement, such as the last determined clearance measurement.

In some embodiments, the display 150 may include a LED light of one color that illuminates to indicate that the measurement data is in the process of transmitting or has successfully been transmitted, and another LED light of another color that illuminates to indicate that the measurement data is in the process of being received or has successfully been received by a computing device.

In some embodiments, the electronics section 140 may include a battery and an antenna mechanism powered at least in part by the battery and configured for transmitting or registering clearance measurement data to a computing device via radio frequency transmissions. In such an embodiment, the taper gauge 100 may include a configuration or an arrangement that guards against accidental engagement of one or more engagement member. In such embodiments, the taper gauge 100 may be configured such that the controller waits the random time and then transmits a signal, or directs a signal to be sent, to one or more visual indicator to cue the user. The visual indicator may be one or more illumination mechanisms (e.g., visual indicators). In such embodiments, the taper gauge 100 may be configured such that after the user is cued via the visual indicator, engagement of an engagement mechanism by the user activates transmission or registration of data corresponding to a previously determined clearance measurement to a computing device. For example, double engagement of an engageable member may activate transmission or registration of clearance measurement data.

In gauge embodiments that are configured for wireless transmission or registration of clearance measurement data to a computing device, the taper gauge 100 may include a loop (magnetic) antenna. Such a taper gauge 100 configuration may advantageously include lower sensitivity to the proximity of dielectric tissue of the user during use as compared to other wireless configurations. For example, the electronics section 140 of the taper gauge 100 may be metallic and the loop antenna may be incorporated into the housing to improve wireless communication performance. In one embodiment the electronics section is in a hermetic housing that protects the electronics from harsh environmental conditions.

Taper gauge 100 configurations that are adapted for producing digital data corresponding to clearance measurements determined by the slidable measurement assembly 120 and wireless transmission of such clearance measurement data allow for clearance measurements to be taken and recorded with the taper gauge 100 by one person. Such one-person use of the taper gauge eliminates, or at least substantially decreases, human error associated with prior taper gauges because the clearance measurement data registration process is fully automatic. Further, an additional benefit of such a taper gauge, as those described herein, is that clearance measurement data can be processed in real-time by, for example, a remote data center. Such real-time clearance measurement data can be utilized and provide valuable feedback to a control system for timely optimization or proper maintenance of the subject apparatus defining the gaps or clearance(s) being measured by the gauge. For example, a user may be given otherwise directed to a particular gap or clearance or a series of particular gaps or clearances of an apparatus or multiple apparatuses. The user can then employ the gauge to measure each clearance, and transmit the digital data corresponding to clearance measurement to a computing device. The computing device may be configured to automatically register the received digital measurements with an indication of the particular clearance being measured. In this way, a user may follow a list or other registry of gaps or clearances and measure each of the clearances presented on the list with a gauge, and automatically register, transfer or upload each measurement to a local device, such as an iPad®, that links or otherwise associates each measurement with its particular clearance identification as indicated on the list.

Figure 2:
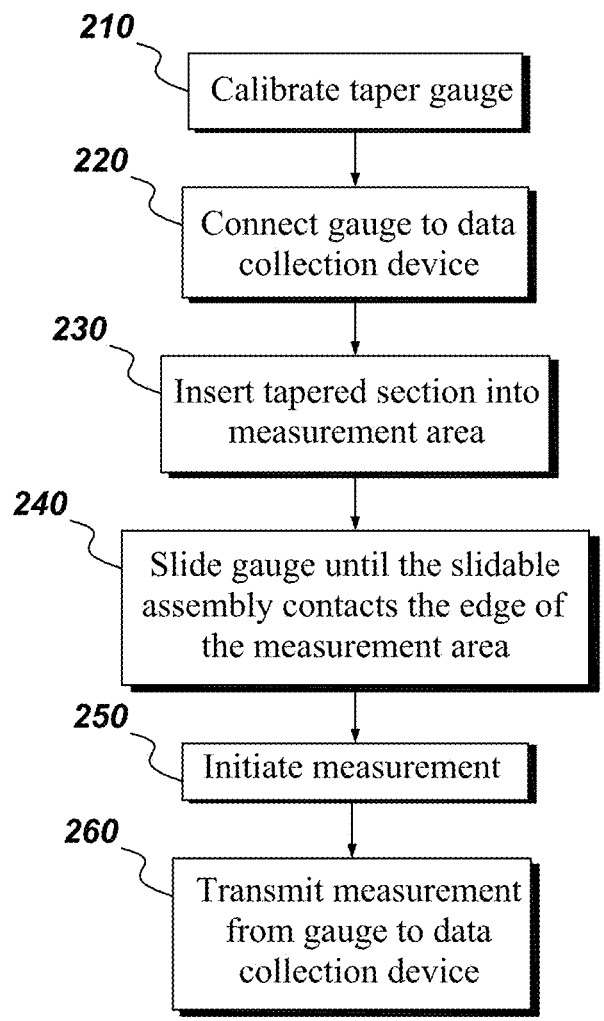
FIG. 2 is a flowchart illustrating one example of the taper gauge measurement.

Referring to FIG. 2, a flowchart of a process 200 for measuring a thickness of a gap using a taper gauge according to one embodiment is depicted. Calibration of the taper gauge 210, while optional, can improve and sustain the accuracy of the system. In one example, the taper gauge is calibrated for each or at least some of the markings on the marking section.

For wireless mode of operation, the gauge is connected to the data collection device 220. The data collection device can be, for example, iPhone®, iPod®, cell phone, tablet, or any portable electronic device having the proper hardware and software.

In operation, the user or operator inserts the tip section of the tapered section into the measurement area or gap 230. The gauge can then be used to determine the thickness of the gap. In one example the gauge sensor uses a manual method to apply a compressive force to the extended leaves, the home leaves or both. The measurement can be processed to determine the gap thickness or directly displayed by the display of the taper gauge. In another example the thickness of the gap is calculated by determining which leaves are in the extended position and/or which leaves are in the home position. Knowing the thickness of the leaves and the position of the leaves (home or extended), allows for determination of the thickness of the gap. Sensors can be used to determine the position of the leaves including sensors that are capacitor-based, optical-based, resistor-based, magnetic-based, inductance-based, notch pattern-based or combinations thereof.

At 250 the gauge is slid until a portion of the slidable measurement assembly contacts the edge of the measurement area or gap. The measurement is initiated at 250. The measurement obtained from the taper gauge is transmitted to a data collection device 260.

The gap thickness can then be provided to the user. In one example the gauge includes a processor and/or transmitter that communicates the signal representative of the gap thickness to a computing device via wireless or wired mechanisms. The computing device can be, for example, a local computing device of the user such as an iPhone® or iPod® with an application designed to receive and process the signal. The signal can be transmitted to a remote location such as the facilities or maintenance center that can store the data and/or use the data for diagnostics or prognostics. The gauge in one example the user notification includes audio capability to announce the gap thickness to the user, wherein the audio capability can be incorporated with the gauge or with the local device of the user such as in a personal digital assistant such as tablets, netbooks, and mobile phones. In a further example, the gap measurements are logged and processed with historical data of gap measurements for the device itself or the device specifications. If the gap measurements are trending or outside of the appropriate range, appropriate maintenance action can be taken.

Figure 3:
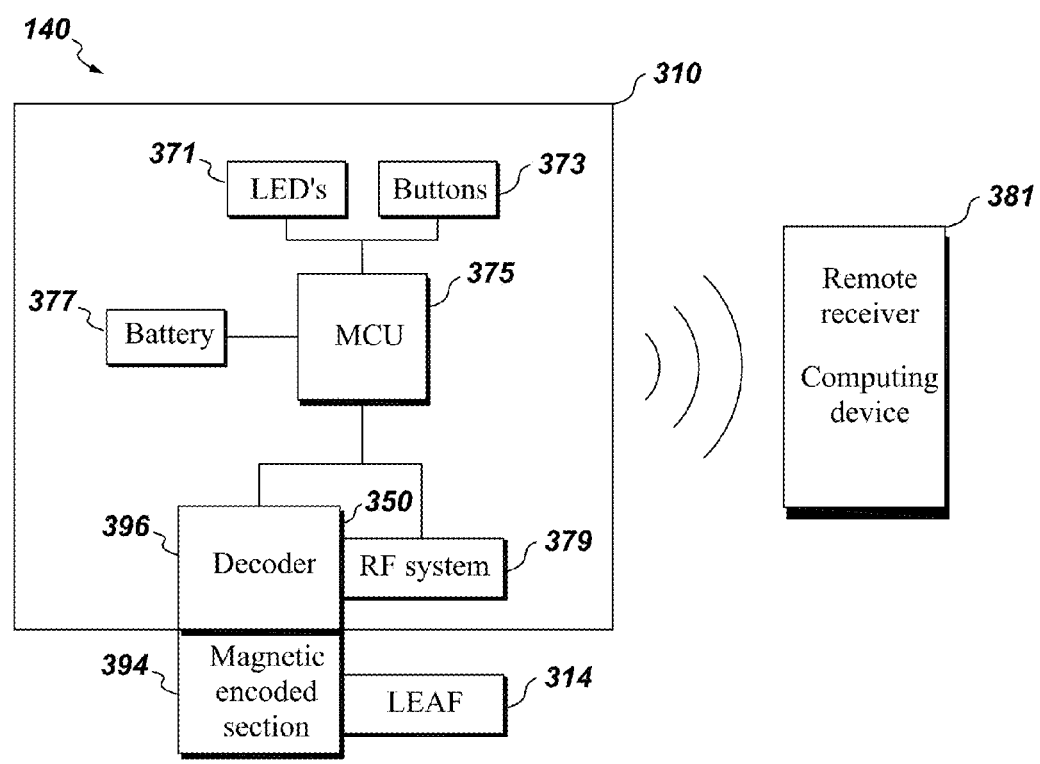
FIG. 3 is a schematic of exemplary electronic components of the exemplary taper gauge of FIG. 1.

Now referring to FIG. 3, a schematic diagram of the electronics section 140 of an exemplary taper gauge 310 is depicted. The exemplary taper gauge 310 may be powered by a power source 377, such as a battery. However, the power source 377 may be any other power source effective in providing power to the taper gauge 310. For example, the power source 377 may be external means (such as via an outlet and cord) or provided by an on-board power generator. The power source 377 may be effective in providing electrical current (AC or DC) to other components of the taper gauge 310.

One component that may be powered by the power source 377 is a microprocessor, or MCU, 375. The exemplary microprocessor 375 may include an integrated circuit having at least one processor core, memory, programmable input/output peripherals, etc. The microprocessor 375 may provide, at least partially, the computing power or capability to the taper gauge 310. The microprocessor 375 in one example is configured to receive signals from other components operably coupled thereto, and provide or control the same or other components or processes in response thereto. For example, the microprocessor 375 may be configured to receive one or more signals from the measurement determination mechanism 350 and utilize the one or more signals to determine the gap or clearance measurement. In gauge embodiments wherein the gap or clearance measurement is made the microprocessor 375 may receive and utilize one or more signals corresponding to the extended leaf or leaves 314 via the measurement determination mechanism 350 and produce signal or data corresponding the gap or clearance. In the illustrated exemplary embodiment, the microprocessor 375 may receive one or more signals from the encoder reading IC reflective of the movement of the decoder 350 along the magnetic encoded section 394. The microprocessor 375 may be configured to utilize those signals to determine the thickness of the gap or clearance from the one or more signals from the encoder reading IC. In some embodiments, the gap or clearance may be determined through one or more lookup tables, calculations, combinations thereof, etc.

As mentioned above, the microprocessor 375 may be configured to receive and/or send signal, data or other electronic "instructions" with other components of the taper gauge 310. For example, the exemplary illustrated taper gauge 310 includes at least one visual indication component 371 and at least one engageable button 373. The microprocessor 375 may be programmed or otherwise configured to activate the at least one visual indication component 371 during certain stages or periods of the gap or clearance measurement and/or processing, storing, transmitting or otherwise handling the clearance measurement signal(s) or data. Then visual indication components include a display such as an LCD or LED display. The display can indicate the numeric values or other indication mechanisms such as bars or lines.

A further feature includes an audio chipset (not shown) coupled to the microprocessor 375. The audio chip set in one example provides an audible signal to the user to indicate the gap measurement or the measurement processing. For example, signal tones can be used to aid in the application of the compressive force applied to the leaves.

Similarly, the at least one engageable button 373 may be operably coupled to the microprocessor 375 such that the at least one engageable button 373 can be used to control the capturing, calculating, processing, etc. of the gap or clearance measurement.

As also shown in FIG. 3, the exemplary taper gauge 310 in one example has a communications section 379 (e.g., RF system) that may include an antenna, transceiver or another other mechanism effective to wirelessly transfer data or signals to a computing device 381, such as data or signals representing a gap or clearance measurement. In one embodiment the communications section is a low energy Blue Tooth™ system. Similarly, the exemplary taper gauge 310 may include a port or other component for transfer data or signals to a remote or local device through a wired or other physical connection. The data in one example is transmitted to a local computing device of the operator and allows the operator to visualize the measurements as well as consider diagnostic and prognostic aspects of the system associated with the gap measurement. For example, the gap measurement may indicate a faulty condition if not within the preferred range. Historical data of prior measurements can also be used to determine the change over time and facilitate maintenance.

As detailed herein, one embodiment for sensing or determining the leaves either extended or home is to include a sensor section 350 integrated with the gauge 310. In one example the sensor section 350 employs magnetic strips 394 and a linear decoder 396.

The sensing used by the taper gauge to determine the actual thickness can also be accommodated using sensors that are capacitor-based, optical-based, resistor-based, magnetic-based, inductance-based, notch pattern-based or combinations thereof.

In one example the system consists of the multiple electrical circuits that come together to provide a fully integrated solution that allows for digital measurements to be taken and then wirelessly transmitted to a measurement recording unit such as a tablet or computer. One feature includes an example 3d model of a digital, wireless taper gauge which uses a magnetic encoding strip to measure linear displacement (which can then be converted to a thickness measurement after calibration and transfer function generation) has been attached. In at least one instance the digital taper gauge is connected over a wireless link to a computational device, including but not excluded to mobile devices such as phones or tablets. In this instance the computational device acts as an extension of the digital taper gauge, processing data and possibly performing complex numerical operations the data received wirelessly from the gauge in order to increase gauge precision.

Referring to the figures in the aforementioned referenced provisional application (i.e., Ser. No. 61/889,025) and FIG. 7, in particular, a portion of a magnetic encoded section 160 embodiment is depicted. As shown, the section 160 includes two rows of pole pairs. The first row (e.g., upper row) of pole pairs may include, for example, 64 pole pairs. The second row (e.g., lower row) of pole pairs may include, for example 63 pole pairs. That is one row has one less pole pair than the other row in the magnetic encoded section 160. As shown, the two rows of pole pairs are out of phase (e.g., 90° out of phase). Further, each row of pole pairs may have associated with it two Hall-effect sensors (not shown). In an embodiment, the length of the section 160 is 160 millimeters. In an embodiment, suitable decoders are available including model iC-MU magnetic encoder, available from iC-Haus America, Rindge, N.H. used in consort with corresponding metal strips available from Dexter Magnetic Technologies, Inc., Elk Grove, Ill.

The linear displacement sensor labeled on the block diagram is the method by which the digital measurement is obtained on the taper gauge. The exact methods of measuring linear displacement include and are not limited to: linear magnetic encoding, linear pressure-induced potentiometer (whereby resistance changes as a function of linear pressure along a strip), optical displacement measurements made using LEDs (similar to an optical mouse), image analysis techniques used to estimate position automatically using an analog scale for reference, capacitive or inductive based linear displacement whereby capacitance or inductance are modulated as a function of displacement along a linear scale, pressure with a piston (hydraulic or pneumatic), rotary sensing with a wheel along the gauge extent. Once the linear displacement value has been obtained, the exact taper gauge measurement can be obtained through the use of a lookup table or transfer function obtained during calibration of the devices; linear displacement measurements are directly translated to taper gauge measurements.

The processing section of the system interfaces with the linear displacement sensor and does all the processing required to convert the measurement to a taper gauge measurement. The RF system 379 of the block diagram, depicted in FIG. 3 for example, is used to wirelessly transmit measurements to a remote receiving device 381 such as a tablet or phone. The battery powers the device. The button can be used to take a measurement. The LEDs can be used for multiple functions including battery status, measurement status, etc.

Figure 4:
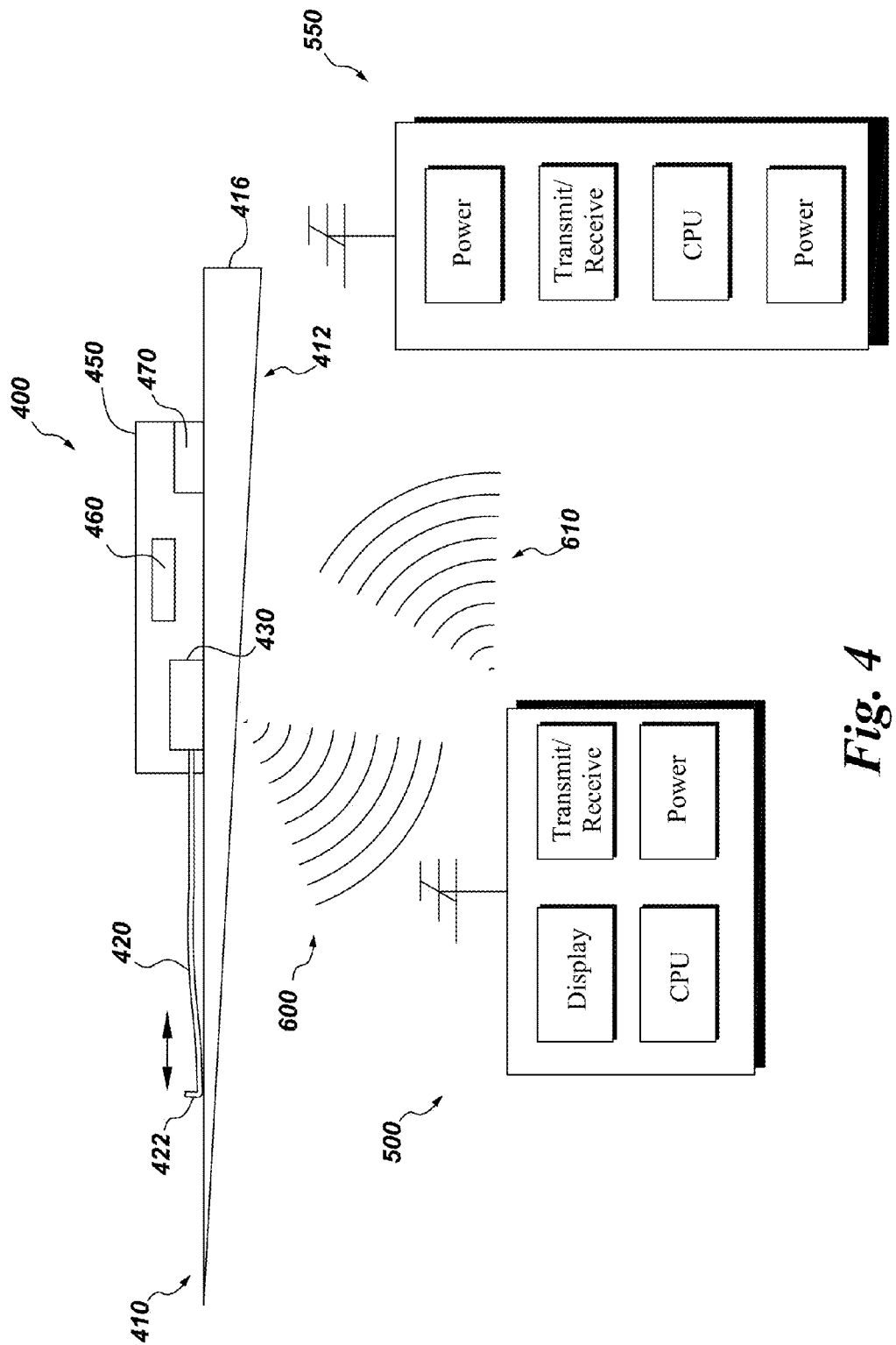
FIG. 4 is a schematic diagram of an exemplary taper gauge and system.

Referring to FIG. 4, a schematic layout of a measurement system showing a taper gauge 400 and two computing devices 500, 550 in communication, via wireless communication 600, 610, with the taper gauge 400. While two computing devices 500, 550 are shown, other quantities of computing devices 500, 550 may be used. It is envisioned in an embodiment that a single computing device 500 would be in close proximity (e.g., less than about 100 meters) to the taper gauge 400, via wireless communication 600 (e.g., low energy Blue Tooth). It is also envisioned in a more common embodiment, the single computing device 500 may be a PDA, cellphone, laptop PC, and the like, within 10 feet and/or physically upon the user of the taper gauge. Similarly, the second computing device 550 may be a PDA, cellphone, laptop PC, the Internet cloud, and the like It should be noted that while the communication(s) 600, 610 are envisioned as wireless communication, the communication may be hard-wired or a combination of the two.

The taper gauge 400 may comprise a taper element 416 that includes a wedge-shaped tip section 410 for insertion into measurement areas. The tip section 410 is distal to the handle end of the taper element 416. A slidable measurement assembly 420 having an end 422 is configured to slide along the taper element 416.

Residing on the taper gauge 400 is an electronics section 450. The electronics section 450 may include, for example, a power source 470 (e.g., battery), a display section 460, and a location determination element 430. The electronics section 450 may optionally further includes a communication means that may include an antenna and/or any suitable device for the transmission of collected data. The electronics section may optionally also include an antenna and/or any suitable device for the receipt of data derived from the collected data.

The location determination element 430 may comprise any suitable means for determining the location along length of the taper element 416 that the tip section 410 has been inserted into a gap of a measurement area.

In an embodiment, the linear determination element 430 may comprise a sensor section that comprises a linear displacement sensor that is in communication with the slidable measurement assembly 420 such that when the taper gauge 400 is placed and in use (e.g., slidably engaging the slidable measurement assembly 420), the linear displacement sensor is able to determine how much the slidable measurement assembly 420 has been displaced. By obtaining the displacement distance and transmitting the displacement distance to the computing device 500, the measurement of the gap can be ultimately received from the computing device 500 (See e.g., FIGS. 5A, 5B) and displayed on display 460, if necessary.

As discussed herein, a variety of linear displacement sensor(s) may be used in the sensor section.

Figure 5A:
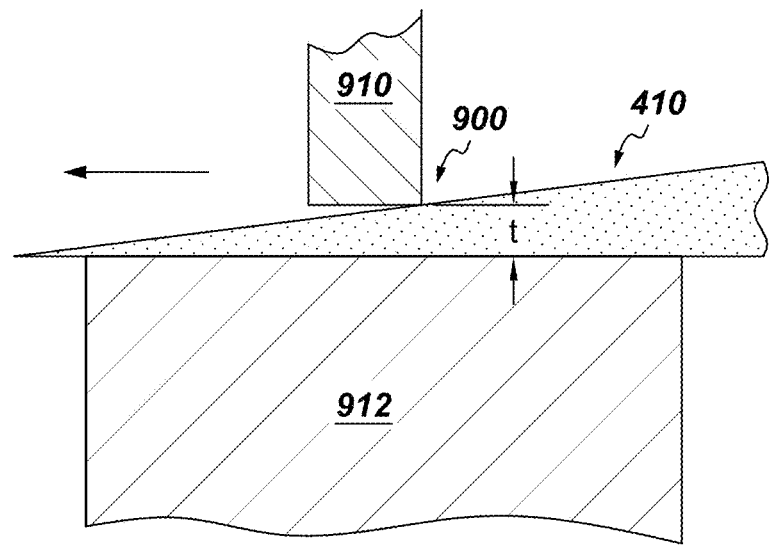
FIG. 5A is a close-up sectional view of a portion of an exemplary of a taper gauge being inserted into a measurement area.
Figure 5B:
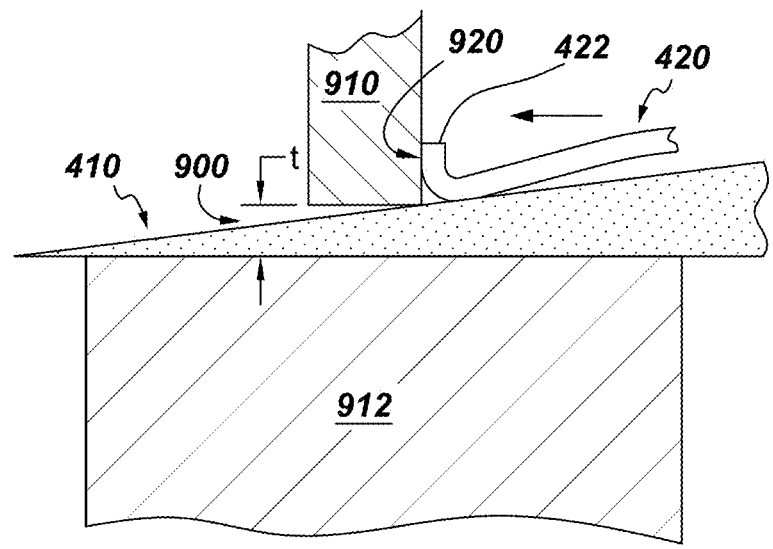
FIG. 5B is the taper gauge of FIG. 5A conducting a measurement in the measurement area.

Referring now to FIGS. 5A and 5B, close-up sectional views of a portion gauge are depicted in temporal order being used to measure a gap in a measurement area. As shown, for example in FIG. 5A, a measurement area 900 that comprises a gap, having a thickness "t" across it, between at least two elements 910, 912. The user is attempting to obtain measurement of the thickness "t" in the measurement area 900, using a taper gauge. Only the tip section 410 of the associated taper gauge is show for clarity purposes. As depicted, the user may insert (e.g., as shown by motion arrow) the wedge-shaped tip section 410 into the gap of the measurement area 900 until the tip section 410 is suitably filling the gap. Upon the completion of the insertion of the tip section in measurement area 900, the user may proceed with obtaining a measurement of the gap (i.e., "t").

Referring now to FIG. 5B, the user then slides forward the slidable measurement assembly 420 (e.g., as shown by motion arrow) towards the measurement area 900. As shown, the user slides the slidable measurement assembly 420 until its end 422 is abutting and touching an adjacent surface 920 of one of the two elements 910, 912 on either side of the gap of the measurement area 900. At this time, the user is able to activate the taper gauge so to measure the dimension across the gap (i.e., "t"), as discussed herein.

The taper gauge developed has significant improvements in measuring precision over the previous gauges. In general, prior gauges have an error of about ±50 µm. Contrastingly, the current taper gauge has an error in precision of about ±2.5 µm (e.g., ±0.1 mil). Thus, this taper gauge has a significant and critical improvement in precision of error that is well over an order of magnitude in improvement over previous taper gauges.

Figure 6:
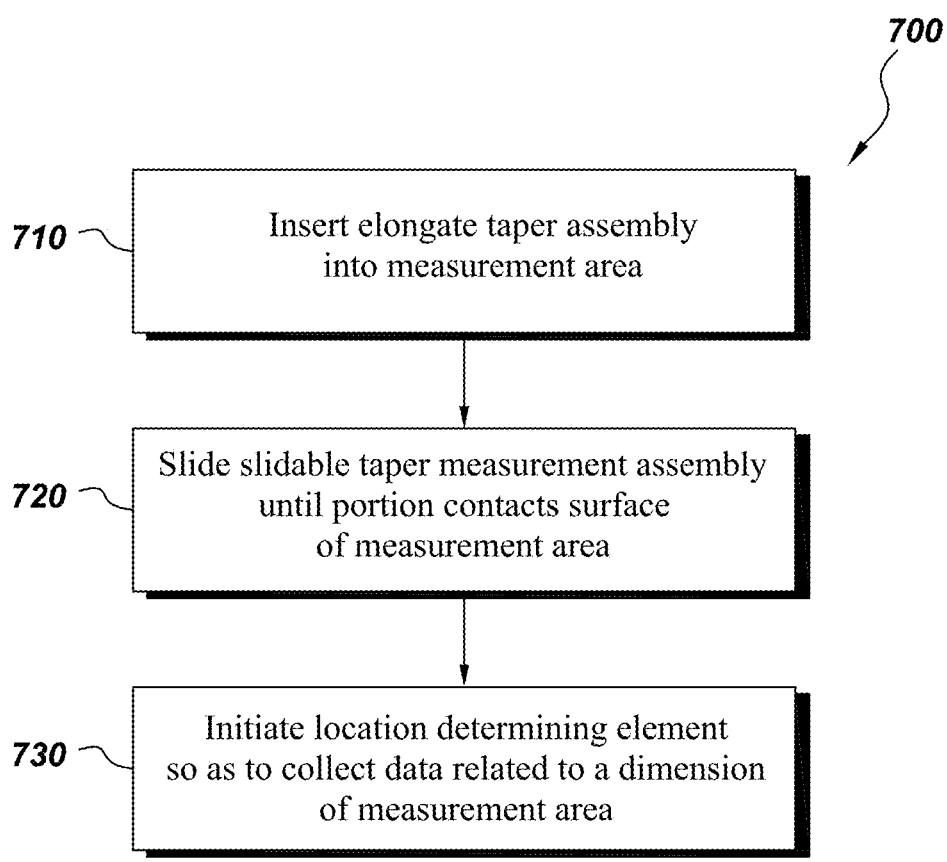
FIG. 6 is a flowchart one example of another method of use.

Referring to FIG. 6, another flowchart illustrating an exemplary method of use if depicted. The method 700 comprises, at 710, inserting an elongate taper assembly of a taper gauge into a measurement area. The taper gauge may comprise a slidable measurement assembly and an electronics section which comprises a location determining element configured to collect data related to a measurement area and a power source. Alternatively, any of the other taper gauge embodiments may be used during inserting. At 720, the slidable measurement assembly is slid until a portion of the slidable measurement assembly contacts a surface of the measurement area. Then, at 730, the location determining element is initiated so as to collect data related to a dimension of the measurement area.

The method 700 may further include additional steps including, but not limited to, digitally calibrating the taper gauge. Further, the taper gauge may be connected (e.g., wired or wirelessly) to a computing device. The computer device may comprise a hand-held computer, lap top computer, Internet cloud, or any other suitable computing device. The connecting may allow the transmitting of the collected data. Alternatively or additionally, the connecting may allow the subsequent receiving of data including, but not limited to, collected data, data, and/or data derived from the collected data to the gauge. The data derived may include, for example, a gap measurement for the measurement area. The connected computing device may additionally transmit to a second computing device, user, the taper gauge and/or an additional (e.g., different) taper gauge.

Although various communication protocols, systems, workflows, methodologies, and the like, are discussed in various embodiments herein, more thorough disclosures describing in more detail these various items that can be used herein are found in commonly assigned U.S. application Ser. No. 14/048,930, filed Oct. 8, 2013 (Entitled: METHODS AND SYSTEMS FOR A UNIVERSAL WIRELESS PLATFORM FOR ASSET MONITORING) and U.S. application Ser. No. 14/048,934, filed Oct. 8, 2013 (Entitled: METHODS AND SYSTEMS FOR DYNAMIC WORKFLOW PRIORITIZATION AND TASKING), the contents of both are incorporated herein by reference in their entirety.

In an embodiment, a taper gauge comprises: an elongate taper assembly having a tip section; an electronics section comprising: a location determining element configured to collect data related to a measurement area when the tip section is inserted in the measurement area; and a power source.

In another embodiment, a method comprises: inserting an elongate taper assembly of a taper gauge into a measurement area, wherein the taper gauge further comprises: a slidable measurement assembly; and an electronics section comprising: a location determining element configured to collect data related to a measurement area; and a power source; sliding the slidable measurement assembly until a portion of slidable measurement assembly contacts a surface of the measurement area; and initiating the location determining element so as to collect data related to a dimension of the measurement area.

In another embodiment, a measurement system comprises: a taper gauge comprising: an elongate taper assembly having a tip section at a first end distal from a second end; and a measurement assembly engaging the taper assembly, wherein the measurement assembly comprises an electronics section, said electronics section comprising a location determining element configured to collect data related to a measurement area when the tip section is inserted in the measurement area and a power source; and a computing device in communication with the taper gauge.

In another embodiment, taper gauge for measuring a gap of a measurement area, the gauge comprises: an elongate taper assembly having a tip section and an opposing handle section, wherein the taper assembly comprises a magnetic encoded section on at least one side of the taper assembly; and a measurement assembly slidably engaging the taper assembly, wherein the measurement assembly comprises an electronics section, said electronics section comprising a decoder and a power source.

In another embodiment, taper gauge comprises: an elongate taper assembly having a tip section at a first end distal from a second end, wherein the taper assembly comprises a magnetic encoded section; and a measurement assembly engaging the taper assembly, wherein the measurement assembly comprises an electronics section, said electronics section comprising a decoder, a power source, and a transmission section.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A taper gauge comprising:
    an elongate taper assembly having a tip section;
    an electronics section comprising:
        a location determining element configured to collect data related to a measurement area when the tip section is inserted in the measurement area, the location determining element comprises a sensor section comprising a linear displacement sensor configured to obtain a displacement of a slidable measurement assembly upon engaging thereof, wherein the slidable measurement assembly is slidably engaged with the elongate taper assembly, the location determining element comprises a linear encoded section that is further in communication with the elongate taper assembly, wherein the linear encoded section comprises a magnetic encoded section comprising two rows of pole pairs, the first row of pole pairs having n pole pairs and the second row having n−1 pole pairs and a the linear displacement sensor comprises a Hall-effect sensor associated with each of the first and second row of pole pairs; and a power source.

2. The taper gauge of claim 1, the electronics section further comprising a transmitting element configured to wirelessly transmit the collected data to a computing device.

3. The taper gauge of claim 1, the electronics section further comprising a receiving element configured to wirelessly receive data derived from the collected data.

4. A method comprising:
inserting an elongate taper assembly of a taper gauge into a measurement area, wherein the taper gauge further comprises:
  a slidable measurement assembly; and
  an electronics section comprising:
    a location determining element configured to collect data related to a measurement area, the location determining element comprises a sensor section comprising a linear displacement sensor configured to obtain a displacement of a slidable measurement assembly upon engaging thereof, wherein the slidable measurement assembly is slidably engaged with the elongate taper assembly, the location determining element comprises a linear encoded section that is further in communication with the elongate taper assembly, wherein the linear encoded section comprises a magnetic encoded section comprising two rows of pole pairs, the first row of pole pairs having n pole pairs and the second row having n−1 pole pairs and a the linear displacement sensor comprises a Hall-effect sensor associated with each of the first and second row of pole pairs; and
    a power source;
sliding the slidable measurement assembly until a portion of slidable measurement assembly contacts a surface of the measurement area; and
initiating the location determining element so as to collect data related to a dimension of the measurement area.

5. The method of claim 4, wherein the dimension comprises a width of a gap.

6. The method of claim 4, further comprising digitally calibrating the taper gauge.

7. The method of claim 4, further comprising wirelessly connecting the taper gauge to a computing device.

8. The method of claim 4, further comprising wirelessly transmitting the collected data to a computing device.

9. The method of claim 4, further comprising wirelessly receiving from the computing device data derived from the collected data.

10. The method of claim 9, wherein the data received is received at the taper gauge.

11. The method of claim 8, further comprising:
transmitting the collected data to one of: a computer cloud, a taper gauge, a second computing device, a person;
processing the collected data.

12. The method of claim 11, the processing comprising providing the dimension.

13. A measurement system comprising:
a taper gauge comprising:
  an elongate taper assembly having a tip section at a first end distal from a second end; and
  a measurement assembly engaging the taper assembly, wherein the measurement assembly comprises an electronics section, said electronics section comprising a location determining element configured to collect data related to a measurement area when the tip section is inserted in the measurement area and a power source, the location determining element comprises a sensor section comprising a linear displacement sensor configured to obtain a displacement of a slidable measurement assembly upon engaging thereof, wherein the slidable measurement assembly is slidably engaged with the elongate taper assembly, the location determining element comprises a linear encoded section that is further in communication with the elongate taper assembly, wherein the linear encoded section comprises a magnetic encoded section comprising two rows of pole pairs, the first row of pole pairs having n pole pairs and the second row having n−1 pole pairs and a the linear displacement sensor comprises a Hall-effect sensor associated with each of the first and second row of pole pairs; and
a computing device in wireless communication with the taper gauge.

14. The measurement system of claim 13, wherein the electronics section is configured to wirelessly transmit the collected data and wirelessly receive data derived from the collected data.

15. The taper gauge of claim 1, wherein the first row of pole pairs has 64 pairs and the second row has 63 pole pairs.

16. The method of claim 4, wherein the first row of pole pairs has 64 pairs and the second row has 63 pole pairs.

17. The measurement system of claim 13, wherein the first row of pole pairs has 64 pairs and the second row has 63 pole pairs.

* * * * *